United States Patent [19]
Wood et al.

[11] Patent Number: 5,183,576
[45] Date of Patent: * Feb. 2, 1993

[54] CATIONIC POLYMERS FOR SLUDGE DEWATERING

[75] Inventors: Michael R. Wood, Philadelphia; Keith A. Bair, Horsham; Fu Chen, Newtown; Stephen R. Vasconcellos, Doylestown, all of Pa.

[73] Assignee: Betz Laboratories, Inc., Trevose, Pa.

[*] Notice: The portion of the term of this patent subsequent to Mar. 31, 2009 has been disclaimed.

[21] Appl. No.: 742,829

[22] Filed: Aug. 9, 1991

Related U.S. Application Data

[63] Continuation-in-part of Ser. No. 533,962, Jun. 6, 1990, Pat. No. 5,100,561.

[51] Int. Cl.⁵ .................................................. C02F 11/14
[52] U.S. Cl. ........................................ 210/734; 210/747
[58] Field of Search ............... 210/609, 725, 727, 728, 210/734, 747, 400, 401

[56] References Cited

U.S. PATENT DOCUMENTS

| | | | |
|---|---|---|---|
| Re. 28,474 | 7/1974 | Anderson et al. | 260/29.6 |
| Re. 28,576 | 10/1975 | Anderson et al. | 260/29.6 |
| 3,023,162 | 2/1962 | Fordyce et al. | 210/54 |
| 3,284,393 | 11/1966 | Vanderhoff et al. | 260/29.6 |
| B1 4,319,013 | 2/1988 | Cabestany et al. | 526/287 |
| 4,396,513 | 8/1983 | Haldeman | 210/734 |
| 4,396,752 | 8/1983 | Cabestany et al. | 526/287 |
| 4,479,879 | 10/1984 | Hashimoto et al. | 210/734 |
| 4,699,951 | 10/1987 | Allenson et al. | 525/194 |

FOREIGN PATENT DOCUMENTS

| | | | |
|---|---|---|---|
| 1341972 | 12/1973 | United Kingdom | 210/734 |
| 1388399 | 3/1975 | United Kingdom | 210/734 |

OTHER PUBLICATIONS

Textbook of Polymer Science; Billmeyer, Jr., 3d ed., pp. 208–213, Wiley & Sons, 1984.
Betz handbook on Industrial Water Conditioning, 8th ed., pp. 253–256, 1980.
Polyelectrolytes for Water and Wastewater Treatment; Schwoyer, CRC Press 1981, chapters 6 and 7.

*Primary Examiner*—Peter Hruskoci
*Attorney, Agent, or Firm*—Alexander D. Ricci; Philip H. Von Neida

[57] ABSTRACT

A method of dewatering sludge is disclosed. This method comprises adding to the sludge an effective amount for the purpose of a polymer comprising repeat unit moieties of the compound methacryloyloxyethyl trimethyl ammonium chloride, said polymer having an intrinsic viscosity of about 1.0 to about 4.5 dl/g.

10 Claims, 14 Drawing Sheets

5,183,576

CATIONIC POLYMERS FOR SLUDGE DEWATERING

The present application is a continuation-in-part of application Ser. No. 07/533,962 filed Jun. 6, 1990 now U.S. Pat. No. 5,100,561.

FIELD OF THE INVENTION

The present invention pertains to the use of particular water soluble cationic homopolymers of a specific intrinsic viscosity range for sludge dewatering.

The homopolymers are obtained from the polymerization of cationic monomers, namely quaternization products of dimethyl aminoethyl methacrylate, diethylaminoethyl acrylate, dimethylaminoethyl acrylate, N,N-dimethylaminoethyl methacrylamide and N,N-dimethylaminopropyl acrylamide.

BACKGROUND OF THE INVENTION

With the increasing concern over pollution problems, sludge dewatering has become an essential part of wastewater treatment programs. No longer can untreated sludge simply be dumped into the nearest river, lagoon or vacant lot. With this environmental interest in mind, improved sludge concentrating and dewatering techniques have become an important task in the water treatment industry.

Generally, sludge is given primary dewatering treatment before being discharged from any given process system. Primary dewatering is usually accomplished using thickeners/clarifiers or settling ponds. Secondary dewatering, including vacuum filtration, centrifugation, belt filters, lagoons, etc., is then commonly employed to further increase the solids content and reduce the water content in the resulting sludge by 50 to 90%. This can cause sludge dewatering to be a slow process.

In sludge handling facilities, problems often encountered in the dewatering process include the formation of sludge cake with high moisture content, poor cake release from dewatering equipment, high disposal costs, slow dewatering, and poor equipment efficiency.

Improved sludge dewatering can lead to increased savings, especially with respect to the costs associated with transportation of the sludge to be disposed.

Water soluble polyelectrolytes, such as anionic and cationic polymers, are often added to the sludge to aid in the production of a drier cake and in the reduction of wear and tear on dewatering equipment.

As detailed in the Betz Handbook of Industrial Water Conditioning, 8th Edition, 1980, Betz Laboratories, Inc., Trevose, Pa., pages 253–256, cationic polymers can increase the settling rate of bacterial floc. These polymers further improve capture of the dispersed floc and cell fragments. By concentrating solids more quickly, the volume of recycle flow can be minimized so that the oxygen content of the sludge is not depleted. Further, the waste sludge is usually more concentrated and will require less treatment for eventual dewatering.

One problem with these anionic and cationic polymers is that their operating parameters are limited. The addition of too much of these dewatering agents can cause the solids to disperse and defeat the whole purpose of dewatering.

With the foregoing in mind, the present inventors embarked upon a comprehensive study in an attempt to dewater sludge in a more efficient fashion.

Accordingly, it is an object of the present invention to dewater sludge more efficiently.

SUMMARY OF THE INVENTION

The present invention pertains to the use of particular water soluble cationic homopolymers of a specific intrinsic viscosity range for sludge dewatering.

The homopolymers are obtained from the polymerization of cationic monomers, namely quaternization products of dimethylamino ethyl methacrylate, diethylaminoethyl acrylate, dimethylaminoethyl acrylate, N,N-dimethylaminoethyl methacrylamide and N,N-dimethylaminopropyl acrylamide.

DESCRIPTION OF THE RELATED ART

The use of cationic polymers for wastewater treatment is known in the art. As cited in "Polyelectrolytes for Water and Wastewater Treatment" chapters 6 and 7 (W. L. K. Schwoyer, CRC Press, 1981), it is generally believed that in settling and flocculation, there is a relationship between molecular weight and effectiveness, with the higher molecular weight polymers of a given type being the most effective.

U.S. Pat. No. 3,023,162 (Fordyce, et al.) describes a homopolymer of dimethylaminoethyl methacrylate quaternized with ethylene oxide or propylene oxide for dewatering. The precise structure of the resulting polymers after reaction is not identified. Polyalkylene oxide is usually formed from this type of reaction and may be attached to the amine site. This differs from the present invention in that the quaternization is achieved by the use of alkylene halides.

U.S. Pat. Nos. 4,319,013 and 4,396,752 (Cabestany et al.) teach that a cationic copolymer of acrylamide and quaternized dimethylaminoethyl acrylate can be used for dewatering. The effective copolymer is in powder form and has an intrinsic viscosity higher than 6 dl/g. The present invention differs in that the polymer is a homopolymer in solution form having an intrinsic viscosity less than 6 dl/g. In contrast to the polymers of Cabestany, this polymer shows an unexpected improvement in sludge dewatering.

U.S. Pat. No. 4,396,513 (Haldeman) discloses the use of a cationic copolymer consisting essentially of acrylamide (10–20%) N,N - dimethylaminoethyl methacrylate methyl chloride (90–80%) with a molecular weight about one million and an intrinsic viscosity of at least 5 dl/g for biological sludge dewatering. This patent also states that the copolymer performs better than the 100% cationic homopolymer in the test conducted.

U.S. Pat. No. 4,699,951 (Allenson et al.) discloses a combination of two cationic polymers with vastly different molecular weights for treating water contaminated with oily waste and dispersed solids. The application and method of treatment differ from the present invention in that it is a polymer admixture that is applied to the wastewater.

DETAILED DESCRIPTION OF THE INVENTION

In accordance with the invention, cationic homopolymers comprising the polymerization products of ethylenically unsaturated cationic monomers such as quaternized dimethylaminoethyl methacrylate, diethylaminoethyl acrylate, dimethylaminoethyl acrylate, N,N-dimethylaminoethyl methacrylamide, and N,N-dimethylaminoethyl acrylamide, etc. These cationic homopolymers are unexpectedly effective in sludge dewatering at an intrinsic viscosity range of 1.0 to 4.5 dl/g, preferably 1.5 to 4.0 dl/g, more preferably 1.5 to 2.0 dl/g.

The cationic monomers are obtained from a quaternization reaction of the above described monomers with alkyl or aryl halides such as methyl chloride, methyl bromide, benzyl chloride, or dimethyl sulfate. The resulting cationic monomer is then polymerized by conventional polymerization techniques. Any of the well known initiators such as azo compounds, peroxides, redox couples and persulfates may be used to polymerize the cationic monomers. Radiation, thermal or photochemical polymerization methods may also be used to yield the polymer. Likewise, for those skilled in the art, any method such as chain transfer agents, concentration, temperature and addition rate variations may be used to regulate the viscosity or molecular weight of the resulting polymer. The polymerization may be conducted in solution, suspension, bulk or emulsion. In the emulsion polymerization, a water-in-oil inverse emulsion technique as disclosed in U.S. Pat. Nos. 3,284,393, Reissue 28,474 and Reissue 28,576 is preferred. The reaction will generally occur between 20° and 100° C., pending the initiation system and polymerization medium used. The pH of the reaction mixture is generally in the range of 2.0 to 7.0. Higher pH will cause the hydrolysis of the cationic monomer.

The preferred method in accordance to the invention is to polymerize the cationic monomer in an aqueous medium using persulfate as an initiator at 80° to 95° C. and at a pH of 2.0 to 4.0. The desired viscosity of the polymer is regulated by adding a proper amount of persulfate, cationic monomer, and water during polymerization. The resulting polymer is verified by viscosity increase, light scattering measurement, and carbon 13 nuclear magnetic resonance (NMR) spectroscopy. Intrinsic viscosity of the polymer is measured in 1 M sodium chloride solution at 30° C. The Huggins equation is used to determine the intrinsic viscosity. According to established theory and equations in the art, intrinsic viscosity values can be correlated with the molecular weight of the polymer. A higher intrinsic viscosity of the polymer will represent a higher molecular weight. This is illustrated in Billmeyer's "Textbook of Polymer Science" pages 208 to 213 (1984). The specific homopolymer which has proven to be most effective as a dewatering aid comprises repeat unit moieties having the structure

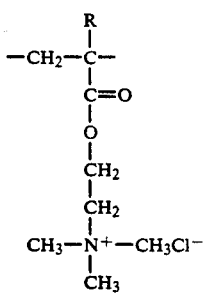

wherein R is H or methyl.

Intrinsic viscosity of the polymer in accordance with this invention is about 1.0 to 4.5 dl/g, preferably 1.5 to 4.0 dl/g, more preferably 1.5 to 2.0 dl/g.

The method of preparation of the homopolymer methacryloyloxyethyl trimethyl ammonium chloride (METAC) designated as Sample Number 1 in Table I is detailed below.

A suitable reaction flask was equipped with a mechanical agitator, a thermometer, a condenser, a nitrogen inlet, and addition inlets for reagents. The flask was charged with 40.0 g of 75% METAC and 20 g of deionized water. The resulting solution was heated to 90° C. under a nitrogen blanket. An initiator solution containing 0.5% of sodium persulfate in deionized water was prepared separately and sparged with nitrogen. The initiator solution (7.5 g) was then added to the reaction flask over 270 minutes at 90° C. Three 20 g aliquots of deaerated, deionized water were added to the reaction at the 30, 90 and 210 minute addition intervals. The reaction was held at temperature for 60 minutes followed by the addition of 120 g of deionized water. After mixing at 90° C. for another 30 minutes the reaction mixture was cooled to room temperature.

The homopolymer solution, after being diluted to 10.6% solids, had a Brookfield viscosity of 1160 cps. The resulting product was a clear solution with a pH at 3.3. The structure of the polymer was verified by C 13 NMR. The structure was characterized by a broad polyacrylate type backbone and no evidence of unreacted monomer. Intrinsic viscosity of the polymer was 1.5 dl/g as measured in 1 M sodium chloride solution at 30 ° C.

The polymer is added to the sludge to be treated in an amount of about 80 to 600 ppm active, preferably 100 to 350 ppm active. These dosages correspond to about 5 to 40 pounds active polymer per ton of dry sludge, based on an average sludge solids of 3%. The polymer may be added directly to the sludge after it has been clarified. The polymer may also be added after the sludge has been subjected to a thickener, digester or the like. The polymer may also be added to the sludge prior to other dewatering processes such as belt filters, vacuum filters, centrifuges or lagoons.

Compounds such as alum, and ferric chloride, anionic polymers, such as copolymers of acrylamide with acrylic acid, 2-acryl amido-2 methylpropylsulfonic acid or styrene sulfonate etc., and other cationic polymers for example, polydimethyldiallyl ammonium chloride (DMDAC); condensation product of epichlorohydrin with alkylamines; copolymers of acrylamide with DMDAC, methacryloyloxyethyltrimethyl ammonium methosulfate (METAMS), methacrylamidopropyltrimethyl ammonium chloride (MAPTAC), acrylamidopropyltrimethyl ammonium chloride (APTAC), acryloyloxyethyltrimethyl ammonium chloride (AETAC), methacryloyloxyethyltrimethyl ammonium chloride (METAC), acryloyloxyethyl diethylmethyl ammonium chloride or their methyl sulfate quats may be used in conjunction with the polymers in this invention for sludge dewatering.

BRIEF DESCRIPTION OF THE DRAWINGS

The appended drawings graphically present the data generated by the examples which are reported herein below.

In the Drawings:

Figure 1:
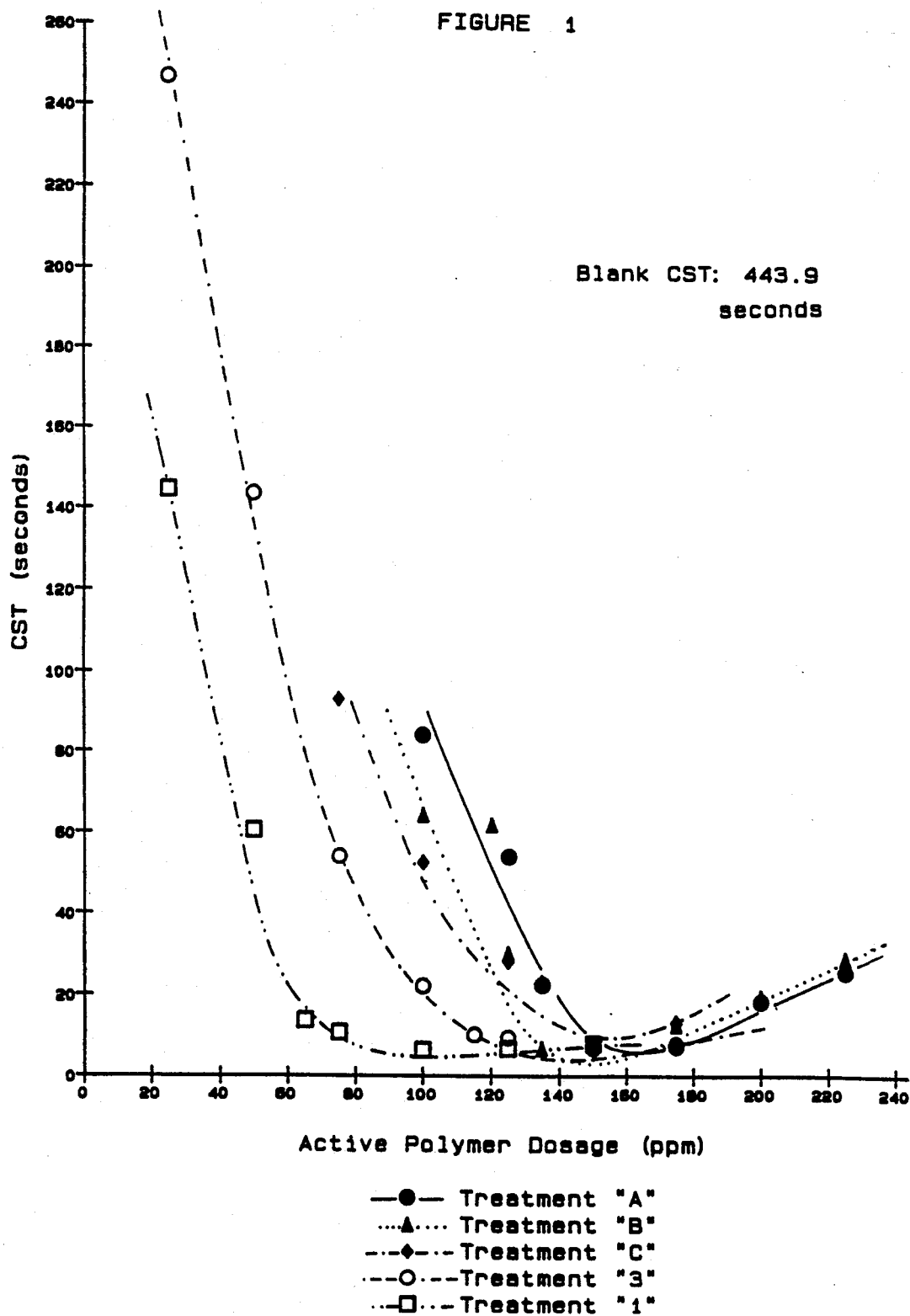

FIG. #1 is a graph showing the capillary suction time of various conditioned samples tested in Table III.

FIG. #2 is a graph showing the capillary suction time of other conditioned samples tested in Table III.

FIG. #3 is a graph showing the percent cake solids of conditioned samples tested in Table IV.

FIG. #4 is a graph showing the percent solids captured of conditioned samples tested in Table IV.

FIG. #5 is a graph showing the percent cake solids of conditioned samples tested in Table V.

FIG. #6 is a graph showing the percent solids captured of conditioned samples tested in Table V.

FIG. #7 is a graph showing the percent cake solids of conditioned samples tested in Table VI.

FIG. #8 is a graph showing the percent solids captured of conditioned samples tested in Table VI.

FIG. #9 is a graph showing the percent cake solids of conditioned samples tested in Table VII.

FIG. #10 is a graph showing the percent solids captured of conditioned samples tested in Table VII.

FIG. #11 is a graph showing the capillary suction time of conditioned samples tested in Table VIII.

FIG. #12 is a graph showing the capillary suction time of conditioned samples tested in Table IX.

FIG. #13 is a graph showing the capillary suction time of conditioned samples tested in Table X.

FIG. #14 is a graph showing the capillary suction time of conditioned samples tested in Table XI.

EXAMPLES

The following examples are illustrative only and should not be construed as limiting the invention.

SAMPLES

Homopolymers of (meth)acryloyloxyethyltrimethyl ammonium chloride were prepared in aqueous solution using sodium persulfate as an initiator at 80° to 95° C. A proper amount of water was added during the reaction to regulate the desired viscosity (molecular weight) of the product. No residual monomer was detected by carbon 13 nuclear magnetic resonance measurement. Intrinsic viscosity of the polymer was measured in 1M sodium chloride solution at 30° C.

Table I below presents a summary of the physical properties of the resulting polymers produced by the above method.

TABLE I

| | | Polymer Properties | | | |
|---|---|---|---|---|---|
| Sample Number | Composition | % Solids | Brookfield Viscosity, cps. at 25° C. | pH | Intrinsic Viscosity, dl/g |
| 1 | METAC | 10.6 | 1160 | 3.3 | 1.5 |
| 2 | AETAC | 9.9 | 1444 | 2.9 | 1.7 |
| 3 | METAC | 9.6 | 12040 | 3.2 | 2.9 |
| 4 | METAC | 3.5 | 114 | 3.5 | 0.86 |
| 5 | METAC | 20.2 | 9020 | 2.9 | 1.8 |

METAC = methacryloyloxyethyl trimethyl ammonium chloride
AETAC = acryloyloxyethyl trimethyl ammonium chloride Comparative dewatering tests were also performed using the well-known polymers described in the prior art. These are described in Table II.

TABLE II

| | Comparative Polymers | |
|---|---|---|
| Polymer | Description | Intrinsic Viscosity, dl/g |
| A | Copolymer of acrylamide/metac | 8.9 |
| B | Polymetac | 5.4 |
| C | Polydimethyldiallyl Ammonium Chloride | 1.4 |
| D | Polydimethyldiallyl Ammonium Chloride (DMDAC) | 0.8 |
| E | Polydimethyldiallyl Ammonium Chloride (DMDAC) | 1.5 |
| F | Copolymer of Acrylamide/AETAC | 9.0 |
| G | Aminomethylated Polyacrylamide | 4.4 |
| H | Copolymer of Acrylamide/AETAC | 14.4 |
| I | Copolymer of Acrylamide/AETAC | 9.7 |

DEWATERING ACTIVITY TEST

The relative dewatering performance of the polymers was evaluated by two different test methods, capillary suction time (CST) and a laboratory filter press. Substrates for the performance evaluations consisted of mixtures of primary and secondary sludge from a pharmaceutical plant in New Jersey taken on four different dates, and secondary sludge from four chemical manufacturing plants located in Louisiana, Indiana, and Michigan.

In the CST test, an aliquot of sludge is placed in a cylindrical cell which is placed on top of a piece of chromatography paper. The capillary pressure exerted by the paper draws the water out of the sludge. A timer records the time in seconds required for the water to pass between two fixed points. Shorter times indicate better dewatering efficacy. Results are evaluated by preparing a graph of CST versus treatment dosage. Generally, the treatment which produces the lowest CST value at the lowest dosage is the most effective.

Figure 2:
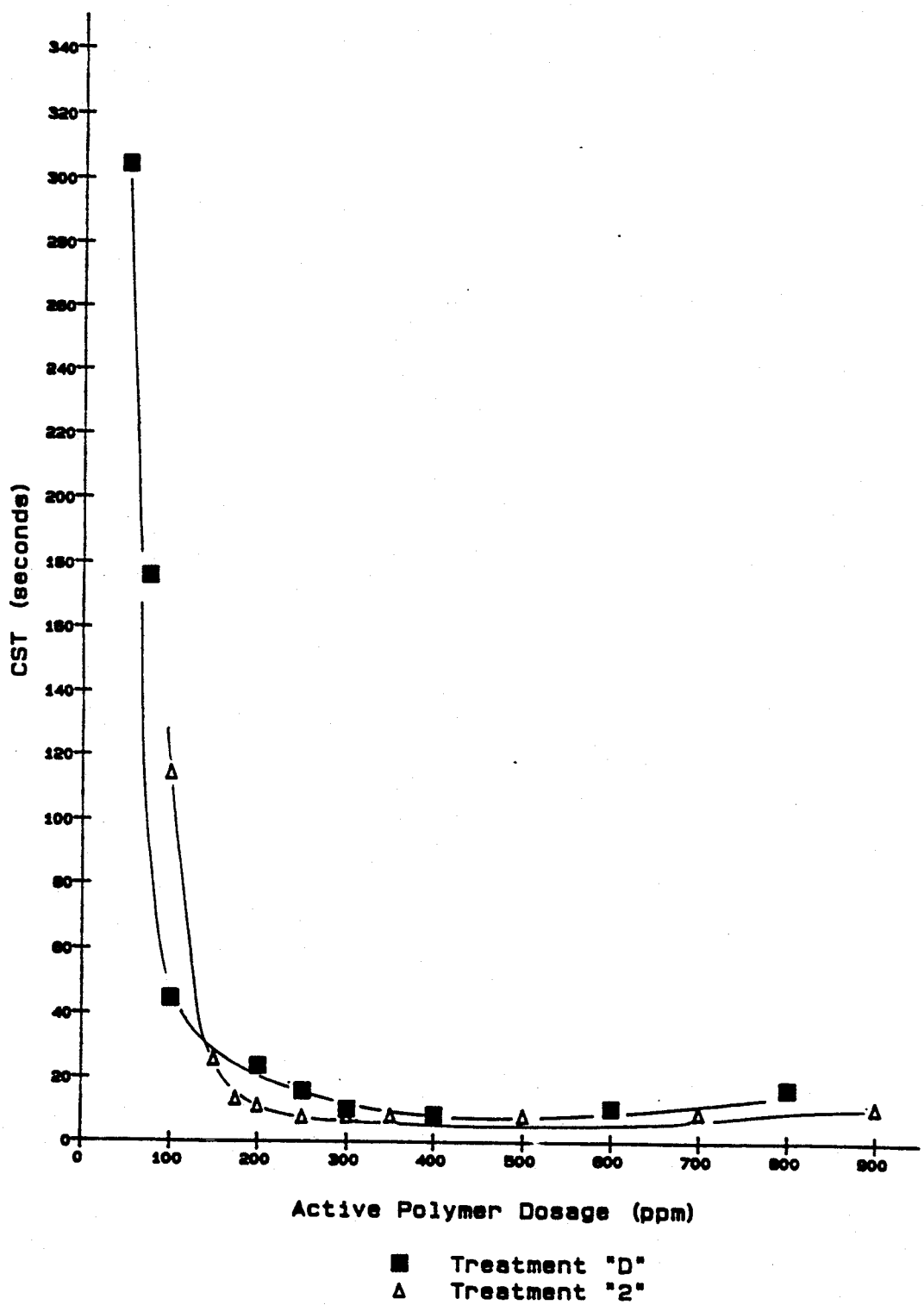
Figure 11:
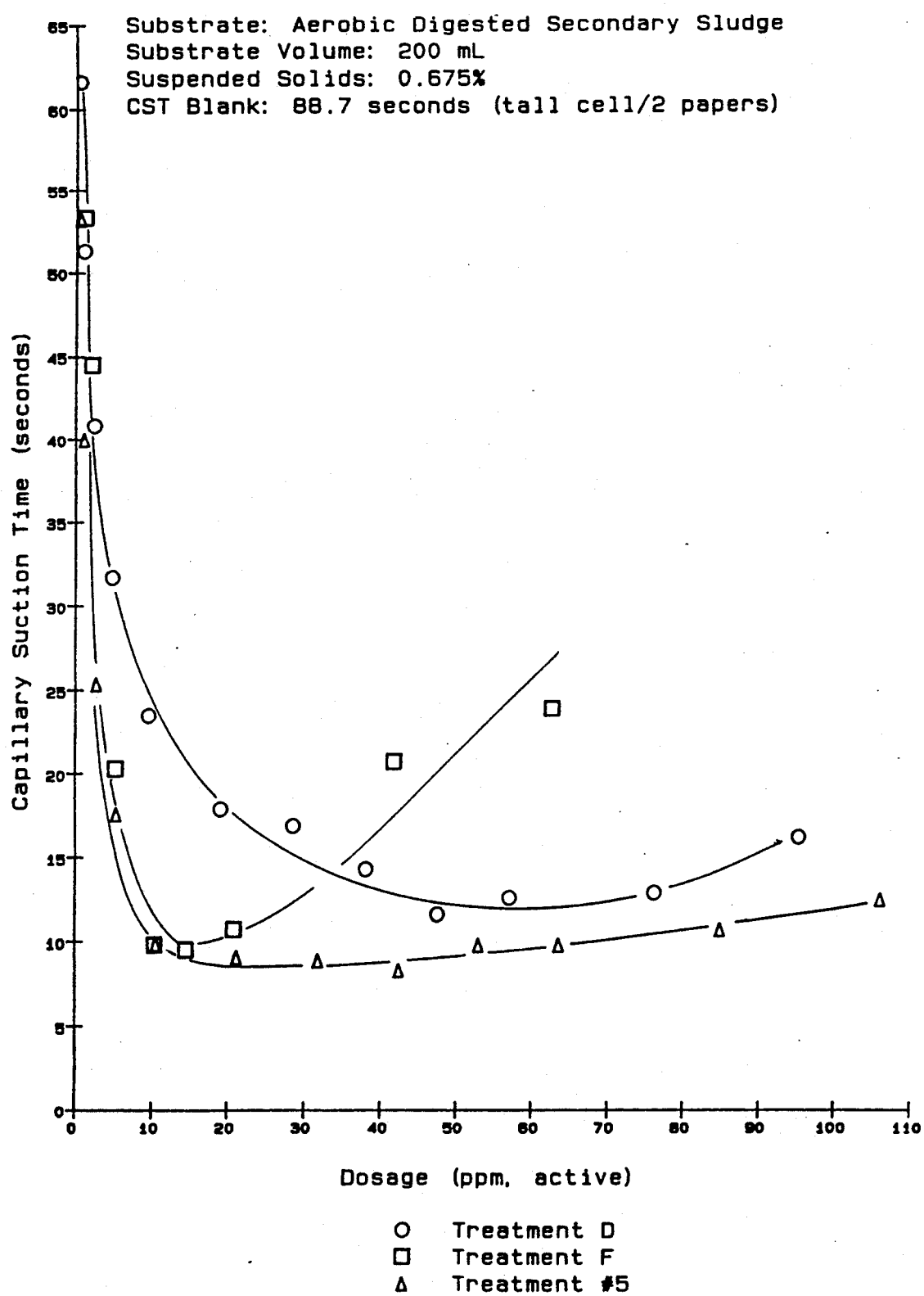
Figure 12:
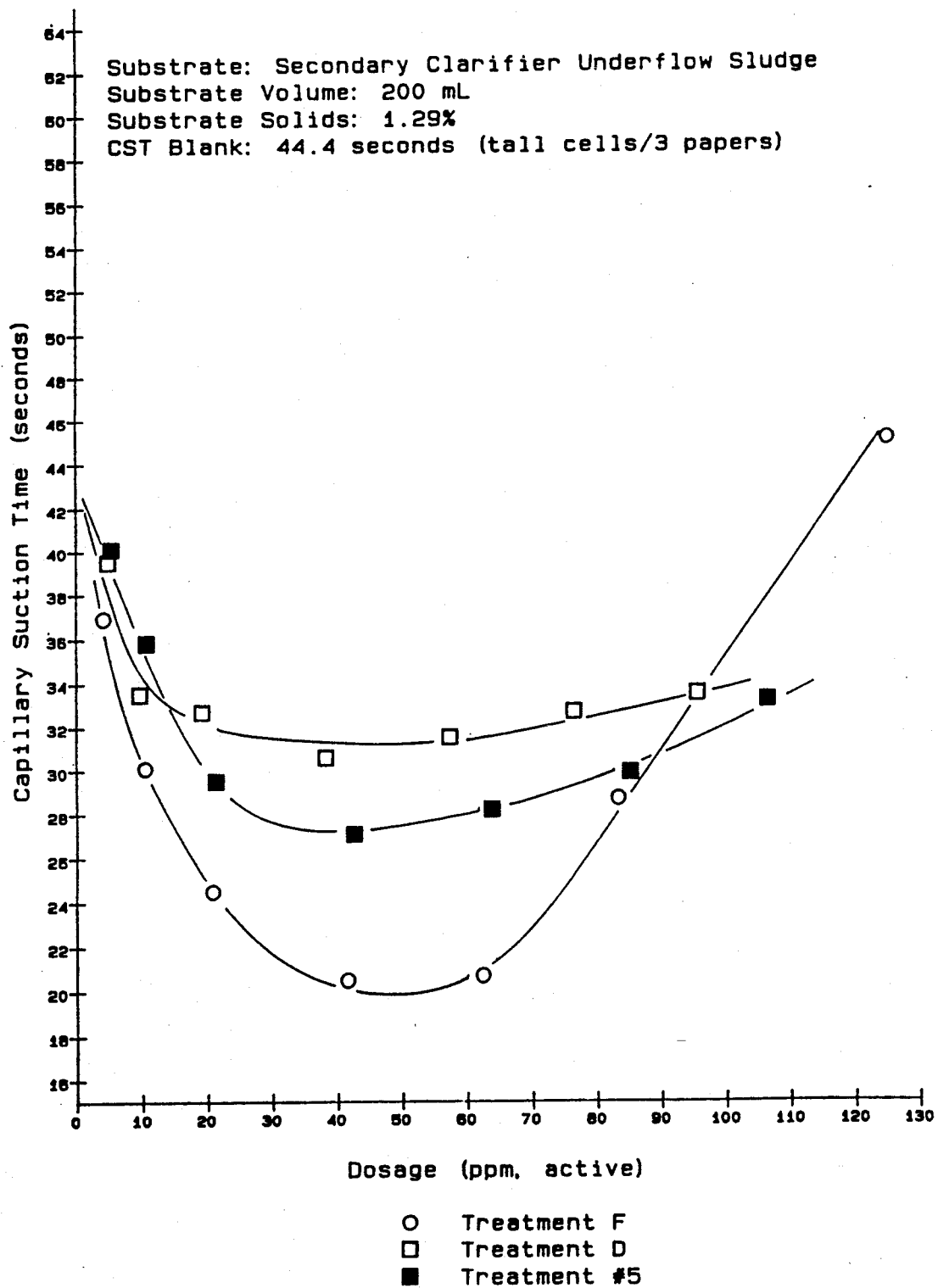
Figure 13:
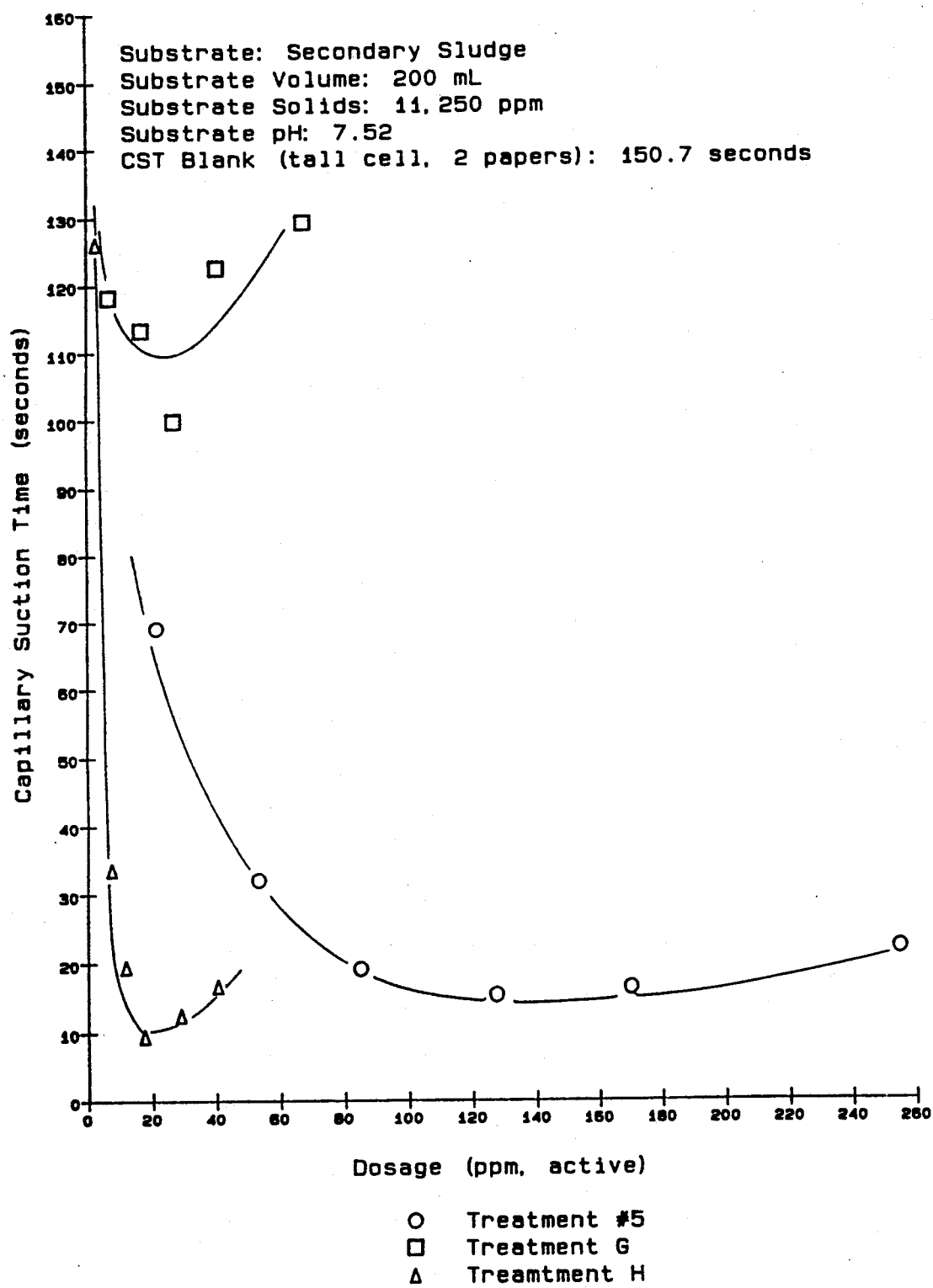
Figure 14:
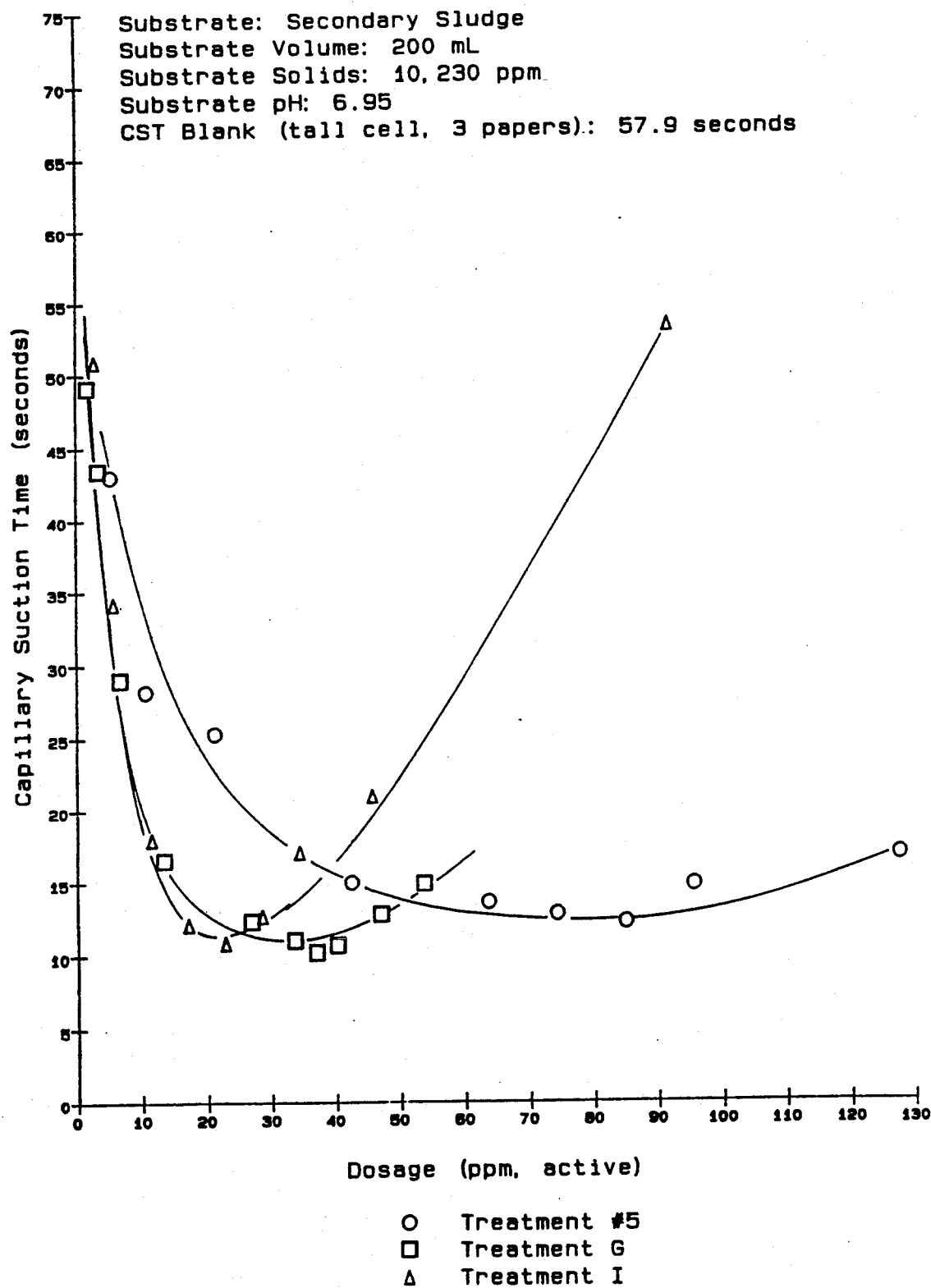

The results appear in FIGS. 1, 2, 11, 12, 13 and 14. The data used to generate these figures is found in Table III and VIII-XI. Letters A through I represent the comparative polymer results, while numbers 1 through 5 represent the homopolymers of the present invention.

Figure 3:
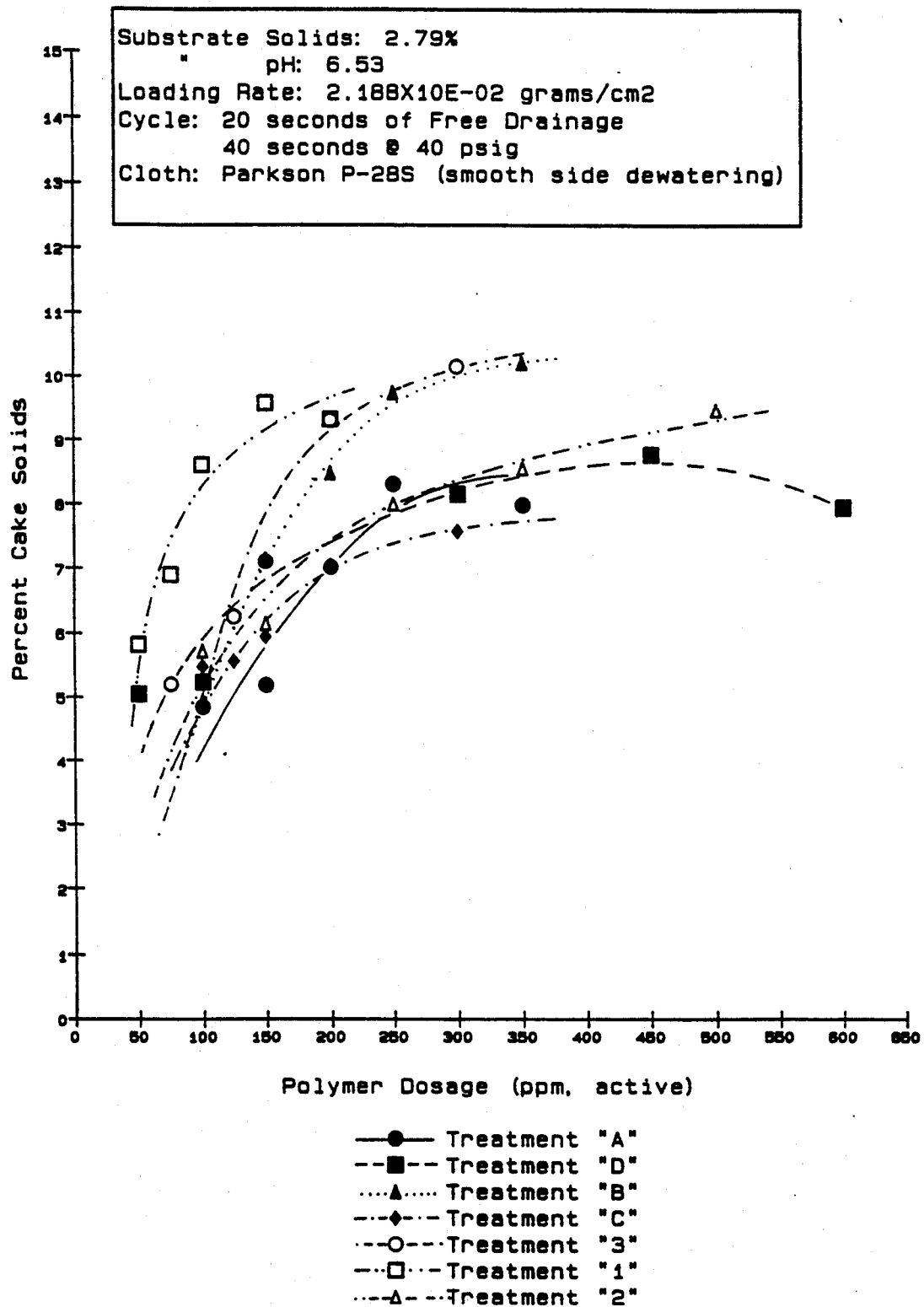
Figure 4:
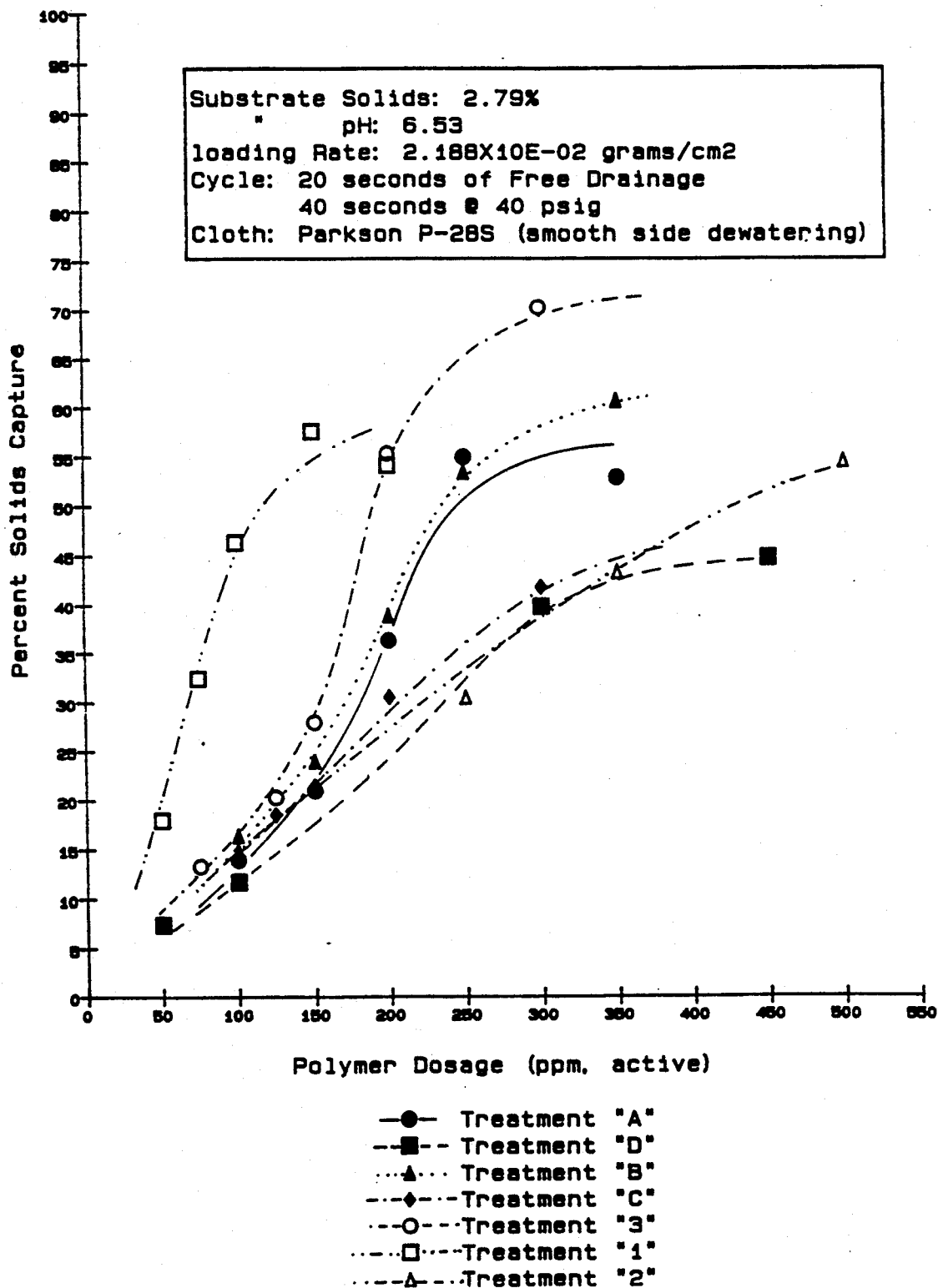
Figure 5:
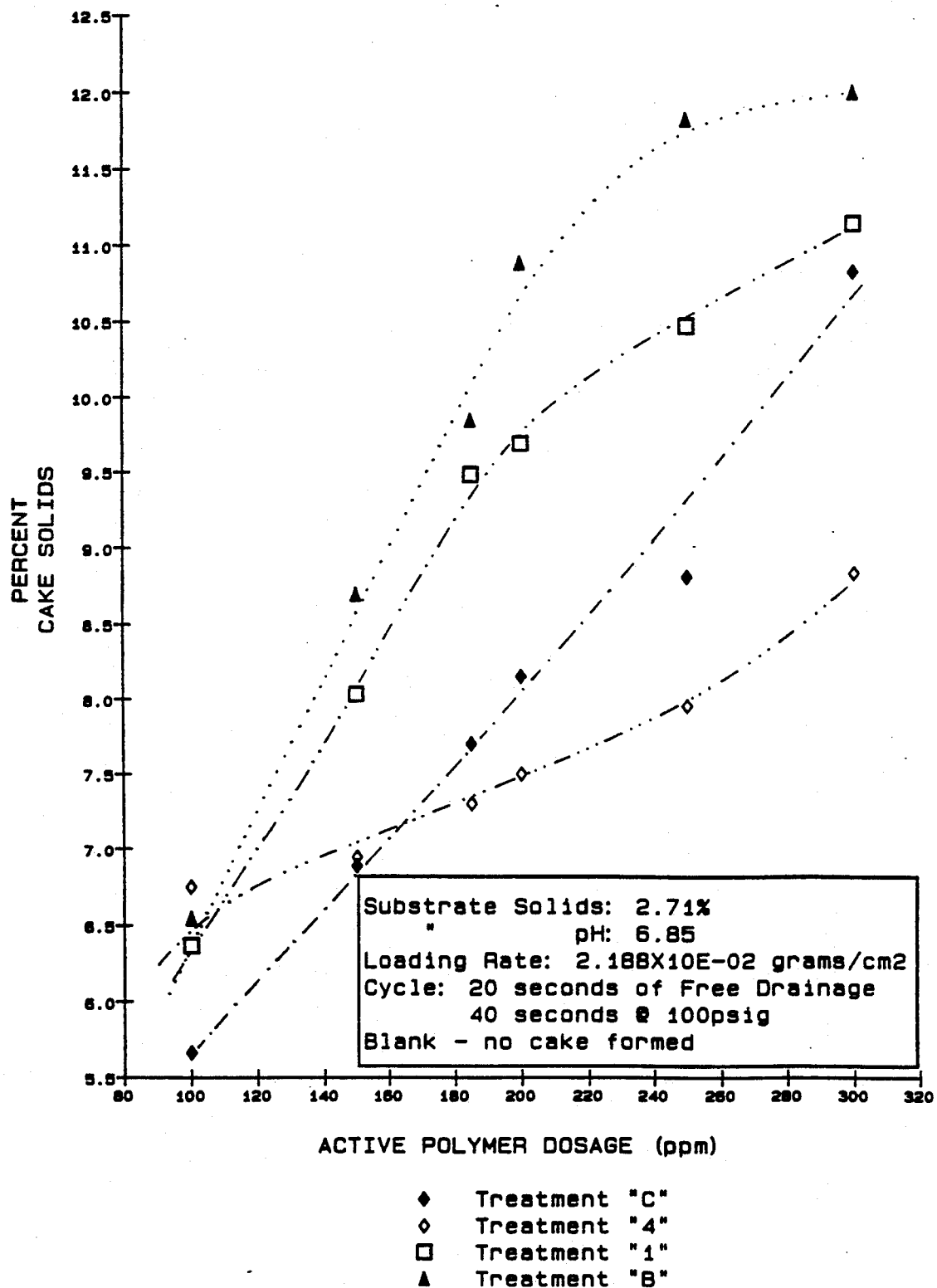
Figure 6:
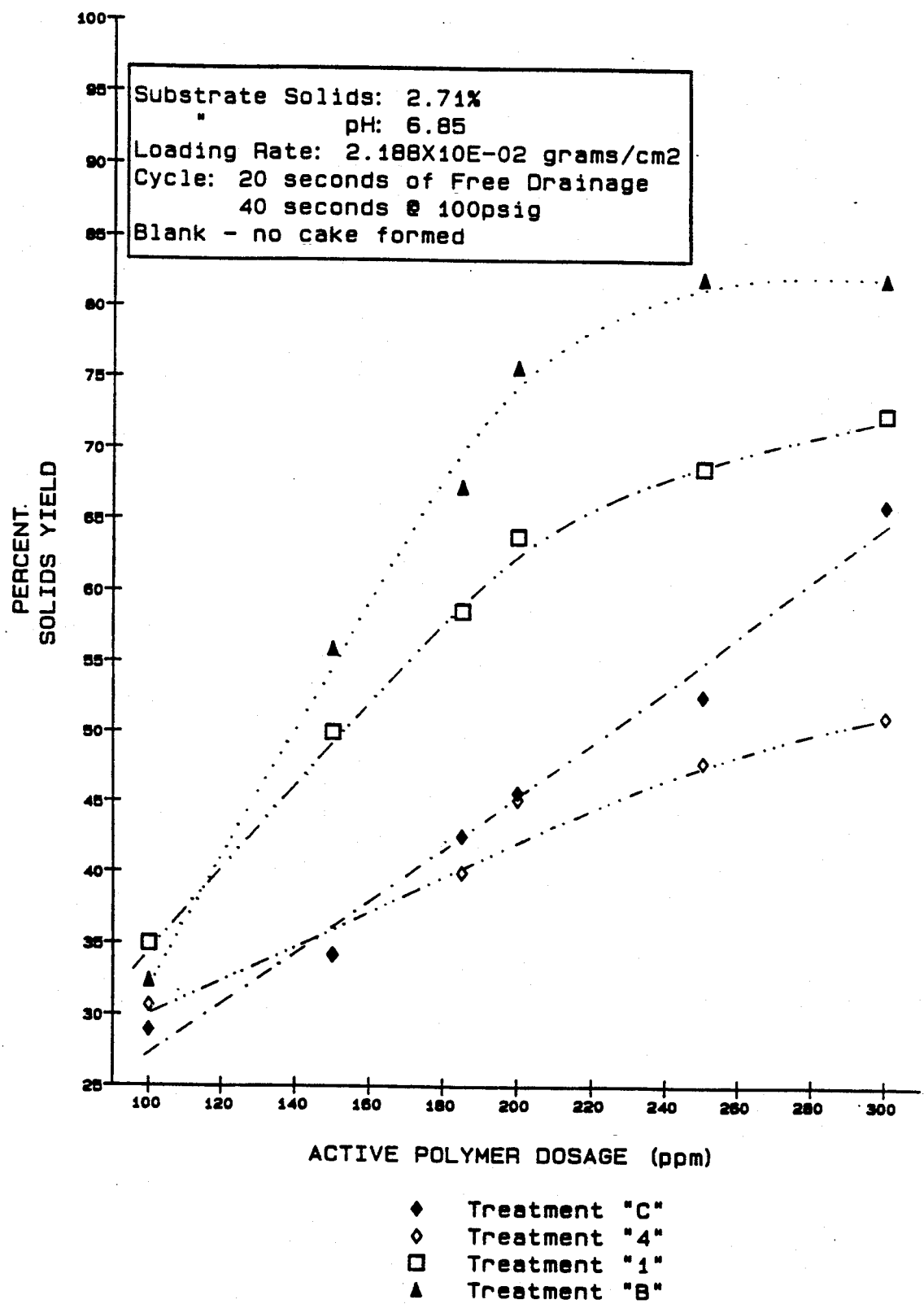
Figure 7:
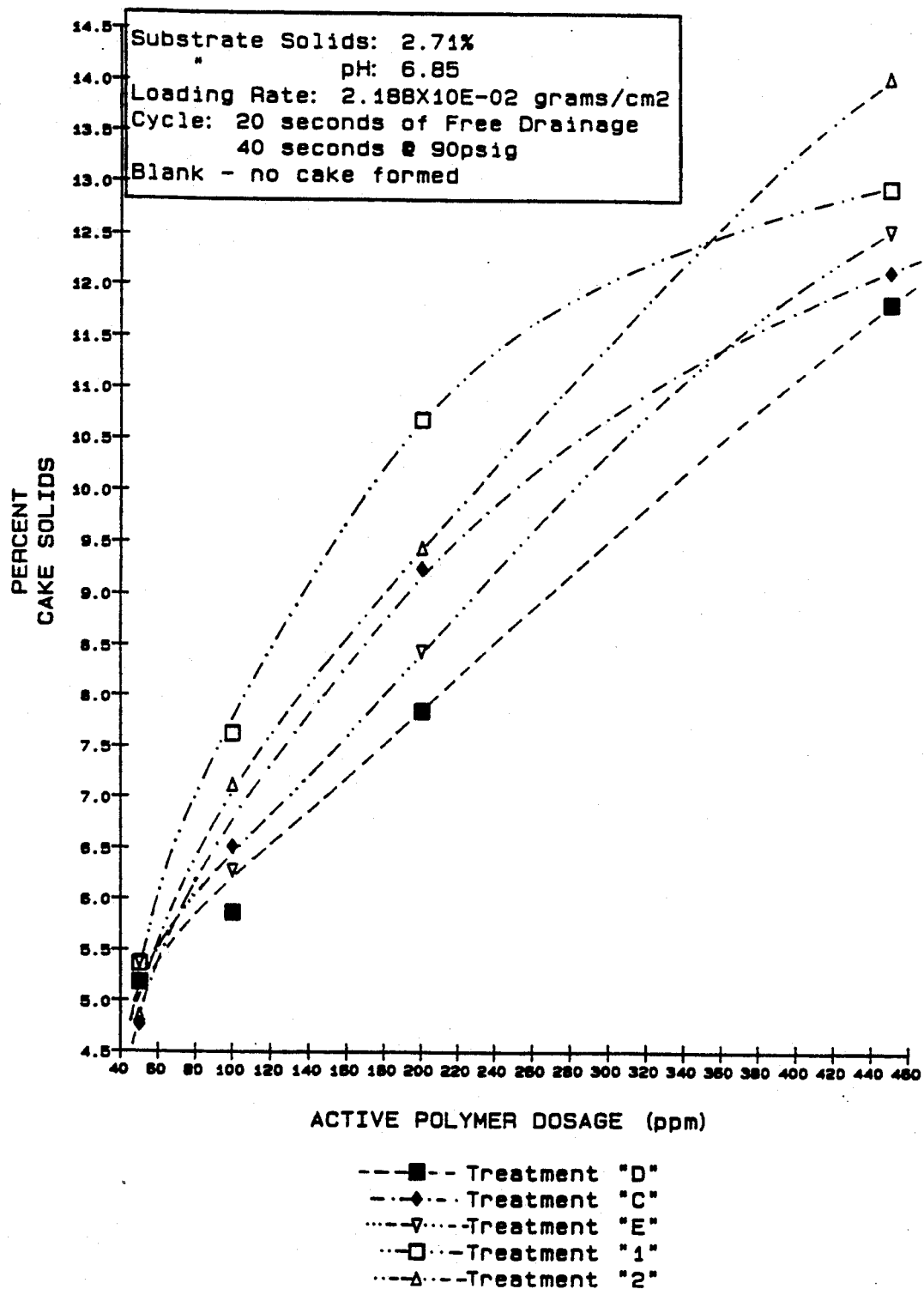
Figure 8:
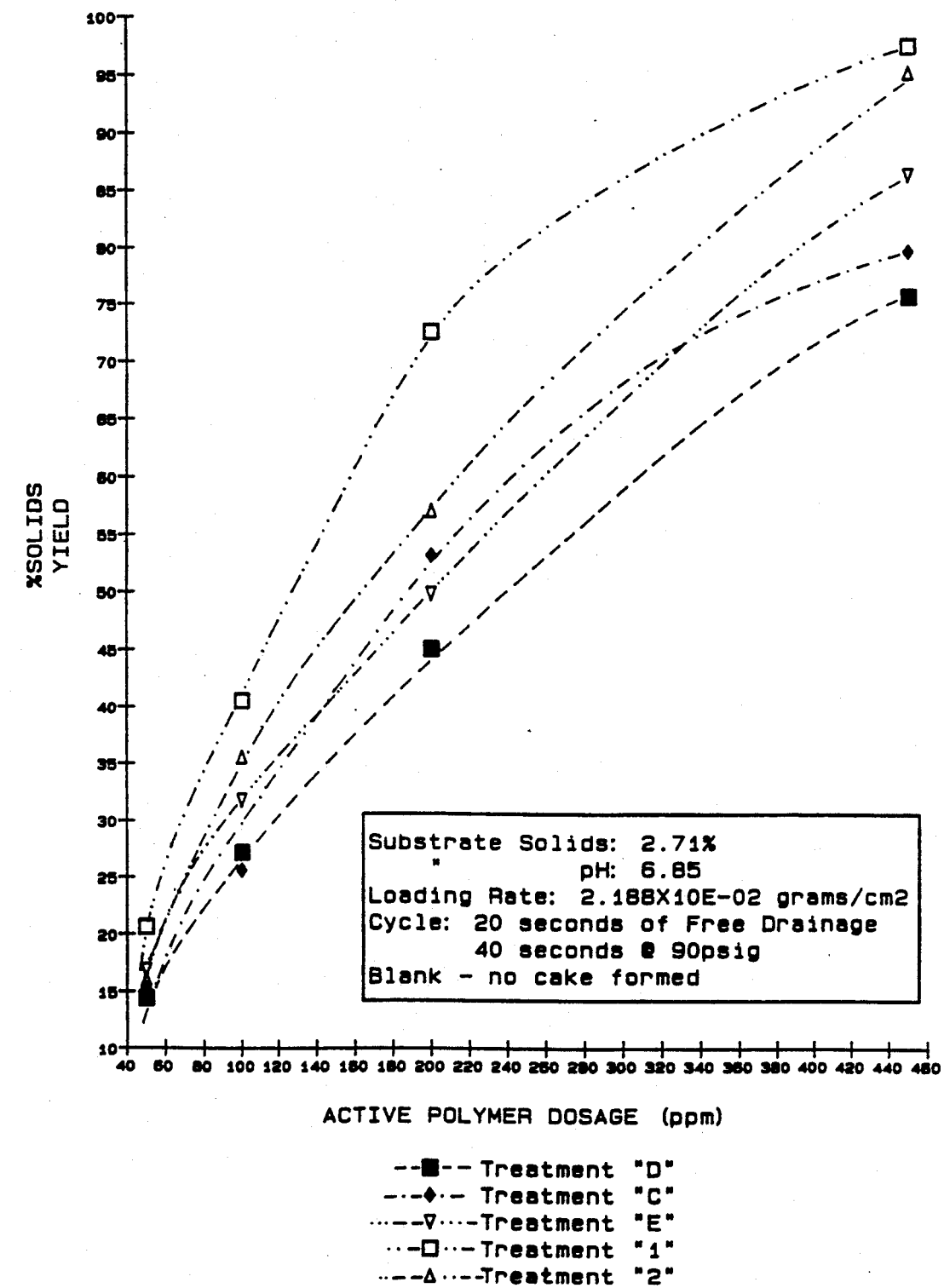
Figure 9:
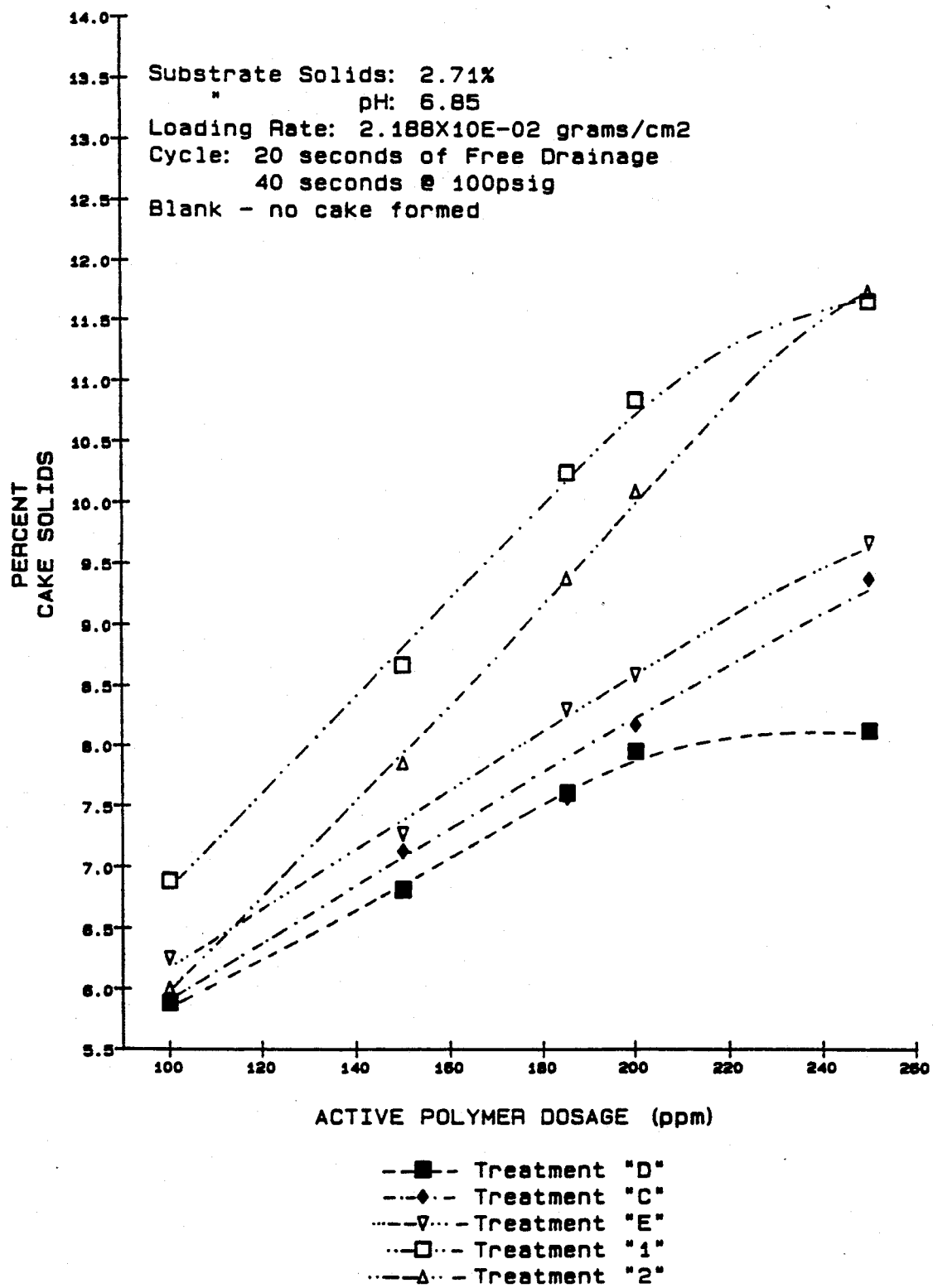
Figure 10:
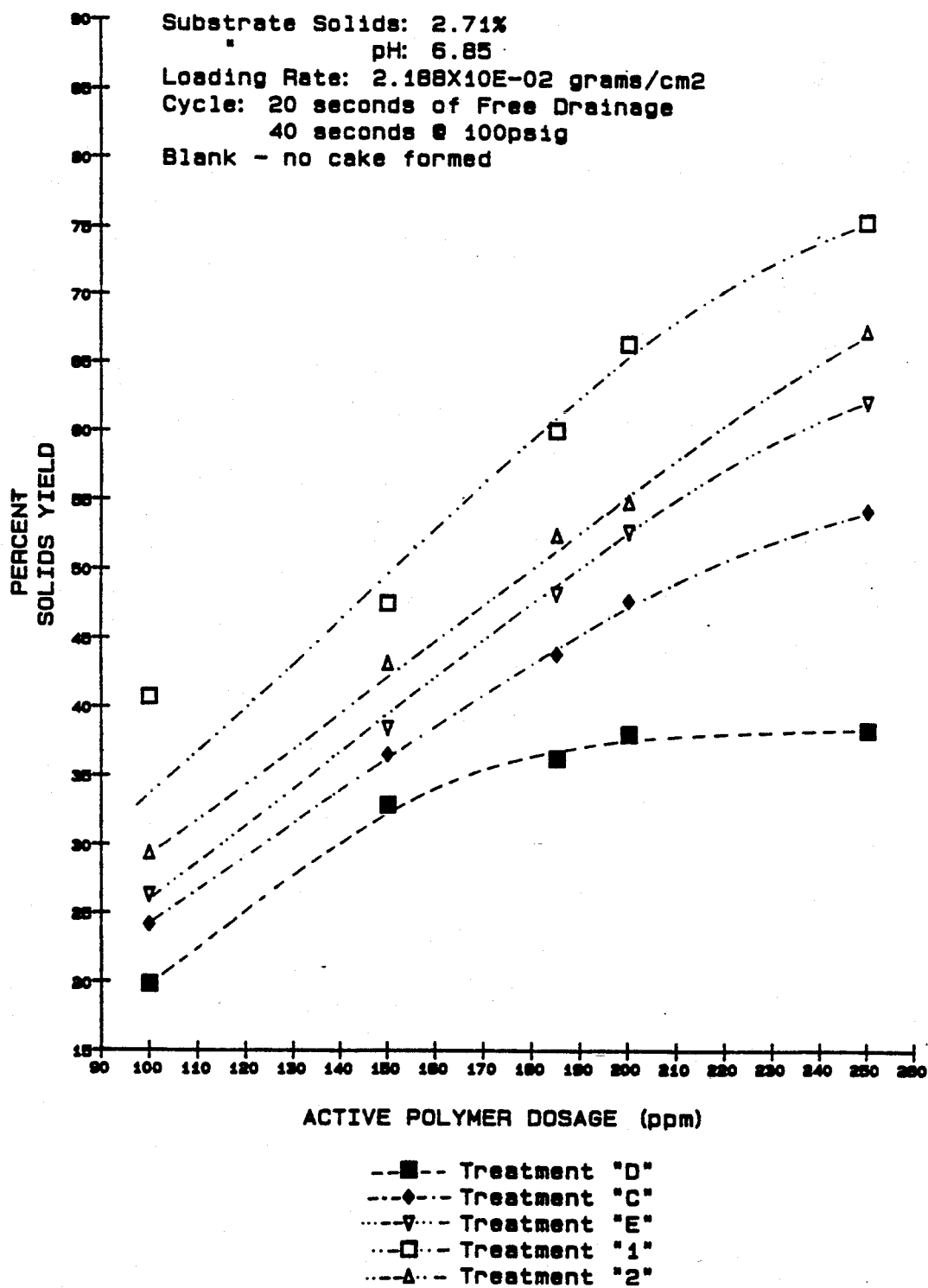

A Larox laboratory scale filter press was the second method employed to evaluate polymer dewatering performance. The design of this instrument permits modeling of full-scale filter press operations by adjustment of conditions such as solids loading, filter media, free drainage time, pressure and press time. The sludge cake produced from the laboratory scale filter press is analyzed for percent solids and percent solids capture, with solids capture being defined as the quantity of solids retained by the cloth filter media compared to the quantity of solids loaded on the press. Results are evaluated by plotting percent solids and percent solids capture results versus treatment dosage. Higher values of percent sludge cake solids and percent solids capture indicates a higher degree of dewatering and better treatment performance. Dosages for conducting evaluations on the laboratory filter press were selected based on the results of the CST tests. Sludge characteristics and test conditions are described in the Tables below. The results have been plotted and appear in FIGS. 3 to 10. Data used to generate the graphs is presented in Tables IV to VII. Letters A through I represent the comparative polymer results, while numbers 1 through 5 represent the homopolymers of the present invention.

TABLE III

Test Conditions

Substrate Volume: 200 mL
Substrate Solids: 2.85%
Substrate pH: 6.90
Treatment mixing: 5 seconds @ 550 RPM prior to treatment addition
30 seconds @ 550 RPM after treatment addition

TABLE III-continued

| | | |
|---|---|---|
| 300 | 10.30 | 8.3 |
| 350 | | 8.4 |
| 400 | 8.50 | 8.0 |
| 500 | | 8.4 |
| 600 | 10.55 | |
| 700 | | 9.5 |
| 800 | 16.90 | 11.6 |

Capillary Suction Time (Seconds):

| Polymer Dosage Treatment: (ppm, active) | A | B | C | #3 | #1 | D | #2 |
|---|---|---|---|---|---|---|---|
| 25 | | | | 246.7 | 144.5 | | |
| 50 | | | | 143.5 | 60.6 | 304.35 | 114.7 |
| 65 | | | | | 13.7 | | |
| 75 | | | 93.2 | 54.3 | 10.8 | 175.90 | 26.0 |
| 100 | 84.2 | 64.5 | 52.9 | 22.2 | 6.4 | 44.60 | 13.7 |
| 115 | | | | 10.2 | | | |
| 120 | | 62.2 | | | | | |
| 125 | 54.3 | 30.4 | 28.6 | 9.5 | 6.8 | | |
| 135 | 22.7 | 7.0 | 23.3 | | | | |
| 150 | 8.2 | 8.0 | 7.3 | 6.9 | 8.0 | | |
| 175 | 7.9 | 12.8 | 13.4 | 7.3 | | | |
| 200 | 18.4 | 19.6 | | | | 23.70 | 11.5 |
| 225 | 25.7 | 29.2 | | | | | |
| 250 | | | | | | 15.90 | 8.1 |

TABLE IV

Substrate Solids: 2.79%
Substrate pH: 6.53
Loading Rate: 2.188 × 10E−02 grams/cm²
Cycle: 20 seconds of Free Drainage
40 seconds @ 40 psig
Belt Cloth: Parkson P-28S (smooth side used for contact with sludge)
Blank - no cake formed
Treatment mixing: 5 seconds @ 550 RPM prior to treatment addition
30 seconds @ 550 RPM after treatment addition.

Laboratory Scale Filter Press Tests

| Treatment | Polymer Dosage (ppm, active) | Percent Cake Solids | Percent Solids Capture |
|---|---|---|---|
| A | 100 | 4.85 | 13.94 |
| | 150 | 5.19 | 21.00 |
| | 200 | 7.02 | 36.36 |
| | 250 | 8.30 | 55.00 |
| | 350 | 7.99 | 53.00 |
| D | 50 | 5.04 | 7.31 |
| | 100 | 5.23 | 11.63 |
| | 300 | 8.15 | 39.86 |
| | 450 | 8.77 | 46.09 |
| | 600 | 7.96 | 44.80 |
| B | 100 | 4.95 | 16.47 |
| | 150 | 7.15 | 24.00 |
| | 200 | 8.48 | 39.00 |
| | 250 | 9.75 | 53.50 |
| | 350 | 10.21 | 60.80 |
| C | 100 | 5.49 | 13.85 |
| | 125 | 5.57 | 18.60 |
| | 150 | 5.95 | 21.50 |
| | 200 | 7.06 | 30.59 |
| | 300 | 7.58 | 41.90 |
| #3 | 75 | 5.20 | 13.28 |
| | 125 | 6.25 | 20.25 |
| | 150 | 7.11 | 27.99 |
| | 200 | 9.31 | 55.35 |
| | 300 | 10.15 | 70.34 |
| #1 | 50 | 5.82 | 17.91 |
| | 75 | 6.90 | 32.40 |
| | 100 | 8.60 | 46.36 |
| | 150 | 9.58 | 57.63 |
| | 200 | 9.32 | 54.16 |
| #2 | 100 | 5.73 | 14.91 |
| | 150 | 6.15 | 21.20 |
| | 250 | 8.01 | 30.60 |
| | 350 | 8.56 | 43.40 |
| | 500 | 9.49 | 54.66 |

TABLE V

Substrate Solids: 2.71%
Substrate pH: 6.85
Loading Rate: 2.188 × 10E−02 grams/cm²
Cycle: 20 seconds of free drainage
40 seconds @ 100 psig
Blank - no cake formed
Treatment mixing: 5 seconds @ 550 RPM prior to treatment addition
30 seconds @ 550 RPM after treatment addition.

Laboratory Scale Filter Press Tests

| Treatment | Polymer Dosage (ppm, active) | Percent Cake Solids | Percent Solids Capture |
|---|---|---|---|
| C | 100 | 5.671 | 28.98 |
| | 150 | 6.893 | 34.24 |
| | 185 | 7.712 | 42.63 |
| | 200 | 8.164 | 45.68 |
| | 250 | 8.824 | 52.64 |

TABLE V-continued

| Treatment | Polymer Dosage (ppm, active) | Percent Cake Solids | Percent Solids Capture |
|---|---|---|---|
| | 300 | 10.851 | 66.05 |
| #4 | 100 | 6.757 | 30.69 |
| | 150 | 6.950 | 34.20 |
| | 185 | 7.311 | 40.01 |
| | 200 | 7.510 | 45.20 |
| | 250 | 7.965 | 47.90 |
| | 300 | 8.850 | 51.15 |
| #1 | 100 | 6.367 | 34.94 |
| | 150 | 8.038 | 49.94 |
| | 185 | 9.491 | 58.57 |
| | 200 | 9.702 | 63.82 |
| | 250 | 10.490 | 68.71 |
| | 300 | 11.168 | 72.49 |
| B | 100 | 6.548 | 32.41 |
| | 150 | 8.707 | 55.99 |
| | 185 | 9.860 | 67.30 |
| | 200 | 10.900 | 75.72 |
| | 250 | 11.850 | 82.10 |
| | 300 | 12.030 | 82.03 |

TABLE VI

Substrate Solids: 2.71%
Substrate pH: 6.85
Loading Rate: 2.188 × 10E−02 grams/cm$^2$
Cycle: 20 seconds of free drainage
40 seconds @ 90 psig
Blank - no cake formed
Treatment mixing: 5 seconds @ 550 RPM prior to treatment addition
30 seconds @ 550 RPM after treatment addition

Laboratory Scale Filter Press Tests

| Treatment | Polymer Dosage (ppm, active) | Percent Cake Solids | Percent Solids Capture |
|---|---|---|---|
| D | 50 | 5.179 | 14.39 |
| | 100 | 5.867 | 27.14 |
| | 200 | 7.844 | 45.12 |
| | 450 | 11.840 | 75.89 |
| C | 50 | 4.769 | 15.29 |
| | 100 | 6.519 | 25.69 |
| | 200 | 9.250 | 53.34 |
| | 450 | 12.160 | 79.99 |
| E | 50 | 5.382 | 16.88 |
| | 100 | 6.280 | 31.86 |
| | 200 | 8.450 | 49.96 |
| | 450 | 12.560 | 86.68 |
| #1 | 50 | 5.356 | 20.58 |
| | 100 | 7.629 | 40.56 |
| | 200 | 10.684 | 72.64 |
| | 450 | 12.960 | 97.75 |
| #2 | 50 | 4.853 | 16.10 |
| | 100 | 7.130 | 35.69 |
| | 200 | 9.450 | 57.23 |
| | 450 | 14.060 | 95.59 |

TABLE VII

Substrate Solids: 2.71%
Substrate pH: 6.85
Loading Rate: 2.188 × 10E−02 grams/cm$^2$
Cycle: 20 seconds of free drainage
40 seconds @ 100 psig
Blank - no cake formed
Treatment mixing: 5 seconds @ 550 RPM prior to treatment addition
30 seconds @ 550 RPM after treatment addition

Laboratory Scale Filter Press Tests

| Treatment | Polymer Dosage (ppm, active) | Percent Cake Solids | Percent Solids Capture |
|---|---|---|---|
| D | 100 | 5.883 | 19.83 |
| | 150 | 6.822 | 32.85 |
| | 185 | 7.610 | 36.25 |
| | 200 | 7.953 | 38.02 |
| | 250 | 8.120 | 38.35 |
| C | 100 | 5.915 | 24.20 |
| | 150 | 7.138 | 36.58 |
| | 185 | 7.575 | 43.90 |
| | 200 | 8.180 | 47.80 |
| | 250 | 9.386 | 54.34 |
| E | 100 | 6.257 | 26.28 |
| | 150 | 7.280 | 38.50 |
| | 185 | 8.312 | 48.26 |
| | 200 | 8.601 | 52.79 |
| | 250 | 9.687 | 62.23 |
| #1 | 100 | 6.889 | 40.71 |
| | 150 | 8.673 | 47.55 |
| | 185 | 10.253 | 60.03 |
| | 200 | 10.856 | 66.35 |
| | 250 | 11.675 | 75.50 |
| #2 | 100 | 6.013 | 29.39 |
| | 150 | 7.867 | 43.28 |
| | 185 | 9.389 | 52.56 |
| | 200 | 10.106 | 54.95 |
| | 250 | 11.762 | 67.45 |

Test Conditions

Substrate: Aerobic Digested Secondary Sludge
Substrate Volume: 200 mL
Substrate Solids: 0.675%
Treatment Mixing: 5 seconds @ 550 RPM prior to treatment addition,
30 seconds @ 550 RPM after treatment addition.
CST Blank: 88.7 seconds (tall cell/2 papers)

TABLE VIII

Capillary Suction Time (Seconds):

| Polymer Dosage (ppm, active) | D | F | #5 |
|---|---|---|---|
| 0.48 | 61.6 | | |
| 0.53 | | | 53.2 |
| 0.95 | 51.3 | | |
| 1.04 | | 53.3 | |
| 1.06 | | | 40.0 |
| 2.08 | | 44.5 | |
| 2.38 | 40.8 | | |
| 2.65 | | | 25.4 |
| 4.76 | 31.7 | | |
| 5.20 | | 20.3 | |
| 5.30 | | | 17.6 |
| 9.51 | 23.5 | | |
| 10.40 | | 9.8 | |
| 10.60 | | | 9.9 |
| 14.56 | | 9.5 | |
| 19.02 | 17.9 | | |
| 20.80 | | 10.7 | |
| 21.20 | | | 9.1 |
| 28.53 | 16.9 | | |
| 31.80 | | | 8.9 |
| 38.04 | 14.3 | | |
| 41.60 | | 20.7 | |
| 42.40 | | | 8.3 |
| 47.55 | 11.6 | | |
| 53.00 | | | 9.8 |
| 57.06 | 12.6 | | |
| 62.40 | | 23.9 | |
| 63.60 | | | 9.8 |
| 76.08 | 12.9 | | |
| 84.80 | | | 10.7 |
| 95.10 | 16.2 | | |
| 106.00 | | | 12.5 |

TABLE IX

Substrate: Secondary Clarifier Underflow Sludge
Substrate Volume: 200 mL
Substrate Solids: 1.29%
Treatment Mixing: 5 seconds @ 550 RPM prior to treatment addition
30 seconds @ 550 RPM after treatment addition.
CST Blank: 44.4 seconds (tall cell/3 papers)

Capillary Suction Time (Seconds):

TABLE IX-continued

| Polymer Dosage (ppm, active) | Treatment: F | D | #5 |
|---|---|---|---|
| 4.15 | 36.9 | | |
| 4.76 | | 39.5 | |
| 5.30 | | | 40.1 |
| 9.51 | | 33.5 | |
| 10.38 | 30.1 | | |
| 10.60 | | | 35.8 |
| 19.02 | | 32.7 | |
| 20.75 | 24.5 | | |
| 21.20 | | | 29.5 |
| 38.04 | | 30.6 | |
| 41.50 | 20.5 | | |
| 42.40 | | | 27.1 |
| 57.06 | | 31.5 | |
| 62.25 | 20.7 | | |
| 63.60 | | | 28.2 |
| 76.08 | | 32.7 | |
| 83.00 | 28.7 | | |
| 84.80 | | | 29.9 |
| 95.10 | | 33.5 | |
| 106.00 | | | 33.2 |
| 124.50 | 45.1 | | |

TABLE X

Substrate: Secondary Sludge
Substrate Volume: 200 mL
Substrate Solids: 1.13%
Substrate pH: 7.52
Treatment Mixing: 5 seconds @ 550 RPM prior to treatment addition,
30 seconds @ 550 RPM after treatment addition.
CST Blank: 150.7 seconds (tall cell/2 papers)

Capillary Suction Time (Seconds):

| Polymer Dosage (ppm, active) | Treatment: #5 | G | H |
|---|---|---|---|
| 2.88 | | | 126.1 |
| 6.70 | | 118.3 | |
| 7.20 | | | 33.7 |
| 11.52 | | | 19.5 |
| 16.75 | | 113.4 | |
| 17.29 | | | 9.6 |
| 21.20 | 69.1 | | |
| 26.80 | | 99.8 | |
| 28.81 | | | 12.5 |
| 40.20 | | 122.4 | |
| 40.33 | | | 16.7 |
| 53.00 | 32.1 | | |
| 67.00 | | 129.3 | |
| 84.80 | 19.1 | | |
| 127.20 | 15.3 | | |
| 169.60 | 16.3 | | |
| 254.40 | 22.0 | | |

TABLE XI

Substrate: Secondary Sludge
Substrate Volume: 200 mL
Substrate Solids: 1.02%
Substrate pH: 6.95
Treatment Mixing: 5 seconds @ 550 RPM prior to treatment addition,
30 seconds @ 550 RPM after treatment addition.
CST Blank: 57.9 seconds (tall cell/3 papers)

Capillary Suction Time (Seconds):

| Polymer Dosage (ppm, active) | Treatment: #5 | G | I |
|---|---|---|---|
| 1.68 | | 49.1 | |
| 2.85 | | | 50.9 |
| 3.35 | | 43.4 | |
| 5.30 | 43.0 | | |
| 5.70 | | | 34.2 |
| 6.70 | | 29.0 | |
| 10.60 | | 28.2 | |
| 11.40 | | | 18.0 |
| 13.40 | | 16.5 | |
| 17.10 | | | 12.1 |
| 21.20 | 25.3 | | |
| 22.80 | | | 10.9 |
| 26.80 | | 12.3 | |
| 28.50 | | | 12.7 |
| 33.50 | | 11.0 | |
| 34.20 | | | 17.1 |
| 36.85 | | 10.2 | |
| 40.20 | | 10.7 | |
| 42.40 | 15.0 | | |
| 45.60 | | | 21.0 |
| 46.90 | | 12.8 | |
| 53.60 | | 14.9 | |
| 63.60 | 13.6 | | |
| 74.20 | 12.8 | | |
| 84.80 | 12.2 | | |
| 91.20 | | | 53.4 |
| 95.40 | 14.8 | | |
| 127.20 | 16.8 | | |

The examples demonstrate that the polymers in this invention exhibit surprisingly superior performance when compared to the conventional or well known polymers as described in the prior art. The polymers according to the invention promote higher cake solids in the sludge dewatering tests which have both environmental and economical benefits. They also have a wider effective dosage range as compared to the prior art polymers making it easier to control the polymer dosage in a treatment plant.

While the invention has been described with respect to particular embodiments thereof, it is apparent that numerous other forms and modifications will be obvious to those skilled in the art. The appended claims generally should be construed to cover all such obvious forms and modifications which are within the true spirit and scope of the present invention.

Having thus described the invention what we claim is:

1. A method of dewatering aqueous sludge, wherein said sludge consists essentially of a mixture of primary and secondary sludge from a pharmaceutical plant and secondary sludge from a chemical plant comprising adding to said sludge an effective amount for the purpose of a homopolymer comprising repeat unit moieties having the structure:

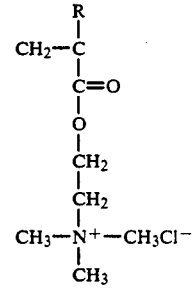

wherein R is hydrogen or methyl and having an intrinsic viscosity from about 1.0 dl/g to about 2.9 dl/g as measured in 1M sodium chloride at 30° C.

2. The method as defined in claim 1 wherein said homopolymer has an intrinsic viscosity from about 1.5 to about 2.0 dl/g.

3. The method as claimed in claim 1 wherein R is hydrogen.

4. The method as claimed in claim 1 wherein R is methyl.

5. The method as claimed in claim 1 comprising adding said homopolymer to said sludge in the amount of about 5 to about 40 pounds active polymer per ton of dry sludge.

6. The method as claimed in claim 1 wherein said homopolymer is added in an amount from about 100 parts per million to about 350 parts per million parts of said sludge.

7. The method as claimed in claim 1 wherein said dewatering aqueous sludge further comprises dewatering said sludge in a belt filter mechanism.

8. The method as defined in claim 1 wherein said dewatering aqueous sludge further comprises dewatering said sludge in a vacuum filter mechanism.

9. The method as claimed in claim 1 wherein said dewatering aqueous sludge further comprises dewatering said sludge in a centrifuge.

10. The method as claimed in claim 1 wherein said dewatering aqueous sludge further comprises dewatering said sludge in a lagoon.

* * * * *